(12) United States Patent
Beaujot

(10) Patent No.: US 6,758,029 B2
(45) Date of Patent: Jul. 6, 2004

(54) HEADER HEIGHT CONTROL APPARATUS

(75) Inventor: Norbert Beaujot, Langbank (CA)

(73) Assignee: Straw Track Manufacturing Inc., Regina (CA)

( * ) Notice: Subject to any disclaimer, the term of this patent is extended or adjusted under 35 U.S.C. 154(b) by 0 days.

(21) Appl. No.: 10/350,040

(22) Filed: Jan. 24, 2003

(65) Prior Publication Data
US 2003/0140609 A1 Jul. 31, 2003

(30) Foreign Application Priority Data
Jan. 31, 2002 (CA) .............................................. 2369862

(51) Int. Cl.$^7$ .............................................. A01D 75/28
(52) U.S. Cl. .................................................. 56/10.2 E
(58) Field of Search ............................ 56/10.2 E, 15.3, 56/15.7, DIG. 15, 208, 212, 213, 214

(56) References Cited

U.S. PATENT DOCUMENTS

| 3,238,709 A | * | 3/1966 | Williams ...................... 56/208 |
| 3,953,959 A | * | 5/1976 | Decruyenaere .............. 56/208 |
| 4,332,126 A | * | 6/1982 | Van Auwelaer et al. . 56/10.2 R |
| 4,437,295 A |   | 3/1984 | Rock |
| 4,594,840 A | * | 6/1986 | D'Almeida et al. ......... 56/11.2 |
| 4,641,490 A | * | 2/1987 | Wynn et al. .............. 56/10.2 E |
| 4,776,153 A | * | 10/1988 | DePauw et al. .......... 56/10.2 E |
| 4,942,724 A | * | 7/1990 | Diekhans et al. ............ 56/10.4 |
| 5,535,578 A | * | 7/1996 | Honey ........................ 56/14.9 |
| 5,713,190 A |   | 2/1998 | Vermeulen et al. |
| 5,964,077 A | * | 10/1999 | Guinn ..................... 56/10.2 E |
| 6,041,583 A |   | 3/2000 | Goering et al. |
| 6,202,395 B1 |  | 3/2001 | Gramm |

* cited by examiner

Primary Examiner—Árpád Fábián Kovács
(74) Attorney, Agent, or Firm—Nixon & Vanderhye P.C.

(57) ABSTRACT

A floating harvesting header apparatus comprises a float pan pivotally attached at a front end thereof to the header at a front attachment location in proximity to the crop intake. The float pan extends rearward under the header and a pan actuator is attached to the float pan to selectively move the float pan up and down and maintain the float pan in a selected vertical position relative to the header such that the header can slide along the ground on the float pan. The header can float up and down independently with only a portion of the header's weight carried on the float pan. The float pan curves down from the front and then curves upward towards the rear such that when the rear end of the float pan is raised the crop intake moves lower and the contact area between the float pan and the ground moves toward the crop intake.

27 Claims, 4 Drawing Sheets

HEADER HEIGHT CONTROL APPARATUS

This invention is in the field of agricultural equipment and in particular the control and monitoring of the header cutting height of combines used for harvesting operations.

BACKGROUND

When harvesting with a straight cut header it is desirable to have the crop intake portion of the header held at a constant height above the ground surface. Most commonly the crop intake is a knife but other crop intake mechanisms are also known. For some crop types such as peas and beans (or other taller crops that have become lodged and are laying close to the ground surface) the knife's vertical location must be maintained very close to the ground surface, to ensure that all the material containing seeds are picked up. At the same time it is desirable to keep the knife from moving too low and contacting the ground to avoid the likelihood of stones and soil damaging the knife or entering the combine.

For other crop types it is desirable to cut higher but at a constant monitored height above the ground surface in order to capture the seeds on the plants, which generally are located within a range of height for a particular crop variety and growing condition. It is often desirable to cut the crop as high as possible while still cutting all the plant portions that contain seeds. Cutting high increases snow catch and reduces the amount of unnecessary material passing through the combine.

The desired cutting height can thus vary from a few inches to two feet or more. Because of variations in the crop, the desired cutting height can also vary from one area of a field to another, and so it is necessary to have the height setting easy for the operator to adjust and monitor. Conventionally the header is fixedly attached to the feeder house of the combine, and the feeder house is pivotally attached to the combine body about a horizontal axis. The feeder house, and thus the header fixed thereto, are raised and lowered by hydraulic lift cylinders pushing between the combine body and the feeder house. Conventionally as well, the cutting height adjustment has been done manually by the operator who judges the cutting height visually and then adjusts the height accordingly.

Automatic header height controls are also known such as those disclosed in U.S. Pat. Nos. 4,437,295 to Rock, 5,713,190 to Vermeulen et al., 6,041,583 to Goering et al., and 6,202,395 B1 to Gramm. These devices generally include a sensor located just behind the knife, preferably as close to the knife as possible since the height at the knife is the critical distance. Means are provided to move the knife up or down in response to signals from the sensors. Many newer combines are factory equipped to receive such signals and to activate the hydraulic lift cylinders that raise and lower the feeder house in response to the signals.

These devices necessarily involve a time lag between the change in terrain which indicates an up or down movement and the actual movement. When a wheel drops into a hole, or where there is a sudden variation in terrain, this time lag can result in the knife digging into the ground, or the knife moving to high and missing crop. The operator may be required to reduce speed in uneven terrain in order to allow for this time lag.

A different approach has been taken with floating headers such as those manufactured by MacDon Industries of Winnipeg, Canada and Honey Bee Manufacturing Ltd. of Frontier, Canada which have improved ground following capabilities. These headers ride on the ground independent of the combine and can float up and down, and tilt vertically from side to side, independent from the combine's main body, to give the header better ground following potential.

In the headers designed for improved ground following, the float mechanism generally includes an attachment of the header to the feeder house that is flexible. Right and left stops are fixed to the feeder house which move up and down with the feeder house. The header rests on these stops when the feeder house is in a raised position, but when the feeder house is lowered gauge wheels on the header contact the ground and as the feeder house continues to move lower, the header is raised off the stops and rests on the gauge wheels.

Since combine headers are very heavy, the float mechanism further includes a bias element, typically one or more springs, that exerts an upward force on the header such that only a fraction of the weight of the header is carried on the gauge wheels. When the feeder house is lowered until the header is raised off the stops on both sides, the header is in full float mode riding on the gauge wheels and is free to float up and down relative to the feeder house within a range between the stops at a lower end of the range and an upper limit defined by the mechanism. Each side of the header can move up and down independent of the opposite side within the range. On uneven terrain the header will often contact a stop on only one side, such that one end of the header rests on the stop, and the opposite end continues to float. Since the header rides on the gauge wheels the header follows the ground with the gauge wheels and there is no time lag between sensing and activation.

It is generally desired to lower the feeder housing only to the elevation required to place the header just into the full float mode, since lowering the feeder further increases the proportion of header weight carried by the gauge wheels and also may restrict the transfer of material between the header and the feeder house through the flexible connection. The combine feeder house may also contact the ground if lowered too much, resulting in dragging of soil and potential damage. In rolling terrain the operator is required to manually move the feeder house up and down to maintain this proper position.

Where the gauge wheels are fixed, the cutting height is set by the gauge wheels as the header rides along the ground on the gauge wheels with most of the header's weight being carried by the feeder house. To adjust the cutting height it is necessary to adjust the gauge wheels up or down. As on some available headers however, the gauge wheel mounts can further include a second bias element configured such that when the feeder house is lowered just into the full float mode, the weight on the gauge wheels is minimal and the second bias element is sized so that the cutting height is substantially set by the gauge wheels. Lowering the feeder house further increases the proportion of header weight carried by the gauge wheels, and the second bias element compresses somewhat in order to develop a counteracting force to overcome the added weight. The cutting height is thus lowered by the operator on the go.

In order to smooth out small variations such as seeding ridges in the field, and to operate satisfactorily in soft ground, it is preferred to have gauge wheels with a fairly large diameter as well as width. Because of the size of the gauge wheels it is necessary to locate them behind the header, or at best under the rear portion of the header. Headers generally are oriented such that the knife at the front is the lowest point, and the bottom or table of the header slopes up towards the rear of the table. This location is substantially removed from the location of the knife, often by five feet or more.

The header thus moves up and down relative to the terrain at the gauge wheels rather than relative to the terrain at the knife, with the result that cutting height is not accurately controlled, especially on uneven or rolling terrain.

Skid pads are often used to protect the header from coming into accidental contact with the ground. When cutting very low an operator will sometimes attempt to rest the header on these skid pads continuously however the skid pads are not designed for such use and in most cases they will start to plow soil after a relatively short period of contact with the ground. There is no means provided to vary the gauged height on the go.

In addition to conventional cutting headers, where a knife severs the crop stems, there are also available stripper headers where rotating fingers strip the desired seed portions of the crop from the stems. Similar considerations apply to these stripper headers as those discussed above as, like a knife, stripper fingers must be operated low enough to catch all the seeds, and yet not in contact with the ground. Whether the crop intake is a knife or the fingers of a stripper header, the crop intake must be maintained at a constant height above the ground for best results.

SUMMARY OF THE INVENTION

It is the object of the present invention to provide a header knife height control that responds immediately to changes in ground terrain at a location in proximity to the knife.

It is a further object of the invention to provide such a header knife height control that includes a full float mode wherein the header slides along the ground on one or more float pans under the header, and wherein the distance between the bottom of the header and the float pans is adjustable and dictates the cutting height of the header.

It is a further object of the invention to provide a combine and floating header apparatus that includes a feeder house height control that controls the vertical position of the feeder house relative to the header so that the header remains in the float range as the combine moves along the ground.

The invention provides, in one aspect, a floating harvesting header apparatus including a knife attached along a front end thereof and adapted at a rear end thereof for attachment to a harvesting vehicle for movement along the ground in an operating travel direction. The apparatus comprises at least one float pan pivotally attached at a front end thereof about a substantially horizontal axis to an underside of the header at a front attachment location in proximity to the knife, the float pan extending rearward under the header. A pan actuator is attached to the float pan and to the header. The pan actuator is operative to selectively move a rear end of the float pan up and down, and operative to maintain the rear end of the float pan in a selected vertical position relative to the header such that the header slides along the ground on the float pan. A float mechanism supports the header such that the header can float up and down independently of the harvesting vehicle in a float range wherein only a portion of the header's weight is carried on the float pan. The float pan curves down from the front attachment location and then curves upward towards the rear end of the header such that when the rear end of the float pan is raised the knife moves lower and a contact area between the float pan and the ground moves forward toward the knife.

The invention provides, in a second aspect, a combine and floating header apparatus comprising a feeder house pivotally attached at a rear end thereof to a front end of the combine about a substantially horizontal feeder axis and a feeder house actuator operative to selectively pivot the feeder house up and down about the feeder axis. A header is flexibly attached at a rear end thereof to a front end of the feeder house for cutting crop and feeding the cut crop into the feeder house and a knife is attached along a front end of the header. A right float pan is pivotally attached at a front end thereof about a substantially horizontal axis to an underside of a right portion of the header at a right front attachment location in proximity to the knife and the right float pan extends rearward under the header. A right pan actuator is attached to the right float pan and to the header. The right pan actuator is operative to selectively move a rear end of the right float pan up and down, and operative to maintain the rear end of the right float pan in a selected vertical position relative to the header such that the right portion of the header slides along the ground on the right float pan. A left float pan is pivotally attached at a front end thereof about a substantially horizontal axis to an underside of a left portion of the header at a left front attachment location in proximity to the knife and the left float pan extends rearward under the header. A left pan actuator is attached to the left float pan and to the header. The left pan actuator is operative to selectively move a rear end of the left float pan up and down, and is operative to maintain the rear end of the left float pan in a selected vertical position relative to the header such that the left portion of the header slides along the ground on the left float pan. A float mechanism supports the header such that the header can float up and down independently of the combine in a float range wherein only a portion of the header's weight is carried on the float pans. The float pans curve down from the front attachment locations and then curve upward towards the rear end of the header such that when the rear end of the float pans are raised the knife moves lower and a contact area between the float pans and the ground moves forward toward the knife.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
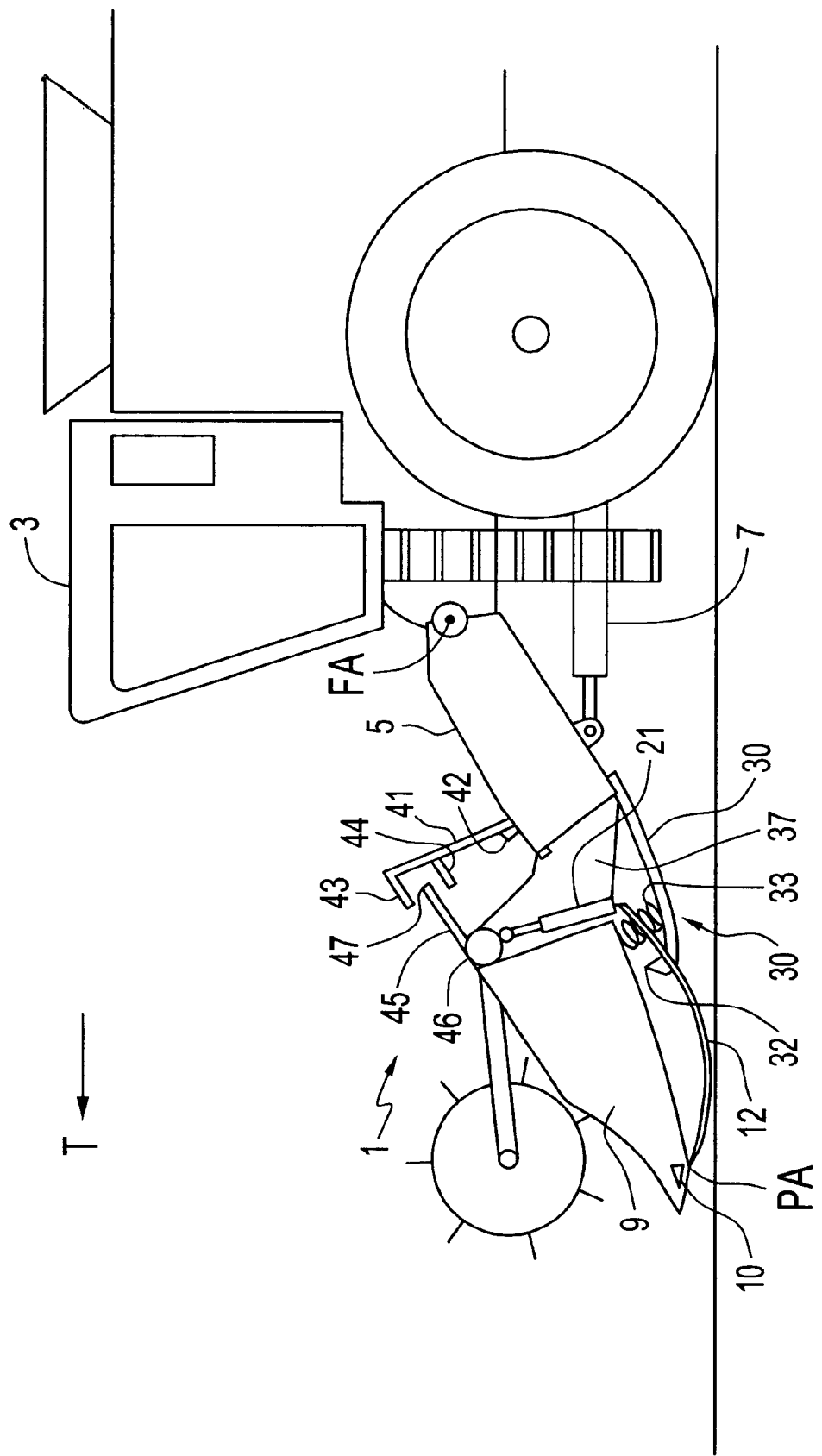
FIG. 1 is a side view of an apparatus of the invention.
Figure 2:
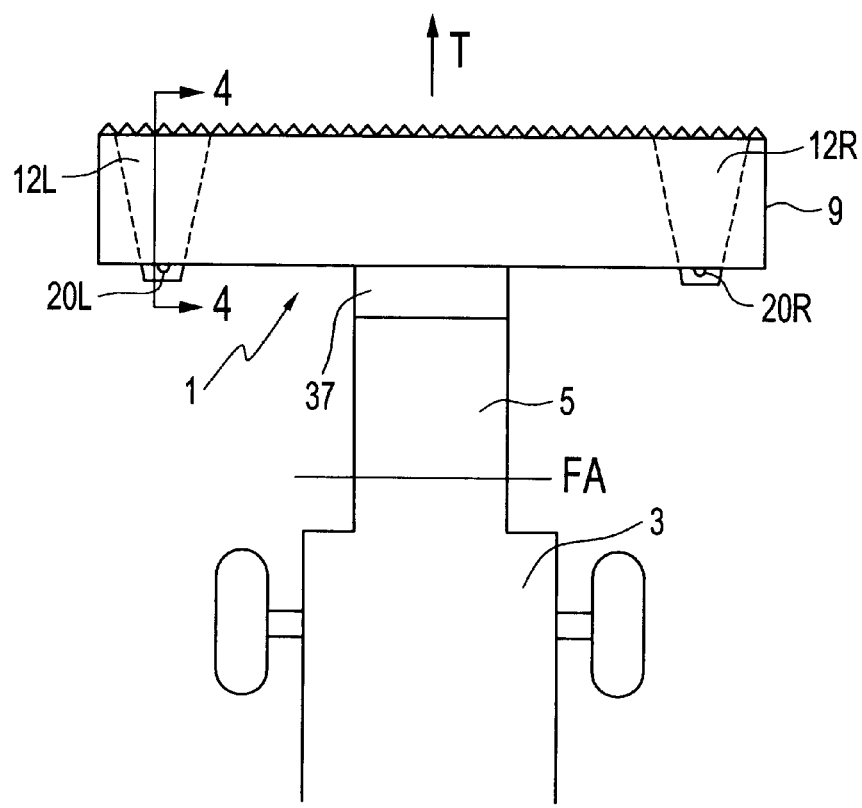
FIG. 2 is a schematic top view of the apparatus of FIG. 1.

FIGS. 1 and 2 illustrate a floating header apparatus 1 of the invention attached to a harvesting vehicle, illustrated as a combine 3, for travel in an operating travel direction T. A feeder house 5 is pivotally attached at a rear end thereof to a front end of the combine 3 about a substantially horizontal feeder axis FA. A feeder house actuator 7 is operative to selectively pivot the feeder house 5 up and down about the feeder axis FA.

A header 9 is attached at a rear end thereof to a front end of the feeder house 5 and a knife 10 is attached along the front end of the header 9. The illustrated header 9 is of the type where the crop intake on the front of the header 9 is a knife 10 that cuts the crop stems so that the belts or augers on the header 9 can feed the cut crop into the feeder house 5. Alternative headers include stripper headers where the crop intake comprises rotating fingers that strip the desired seed portions of the crop from the stems, and leave the stems uncut. Whether the crop intake is a knife 10, as illustrated, or the fingers of a stripper header, the crop intake should be maintained at a constant height above the ground for best results. The description herein where the crop intake is the knife 10 could be also applied to a header where the crop intake is stripper fingers or other means.

Figure 4:
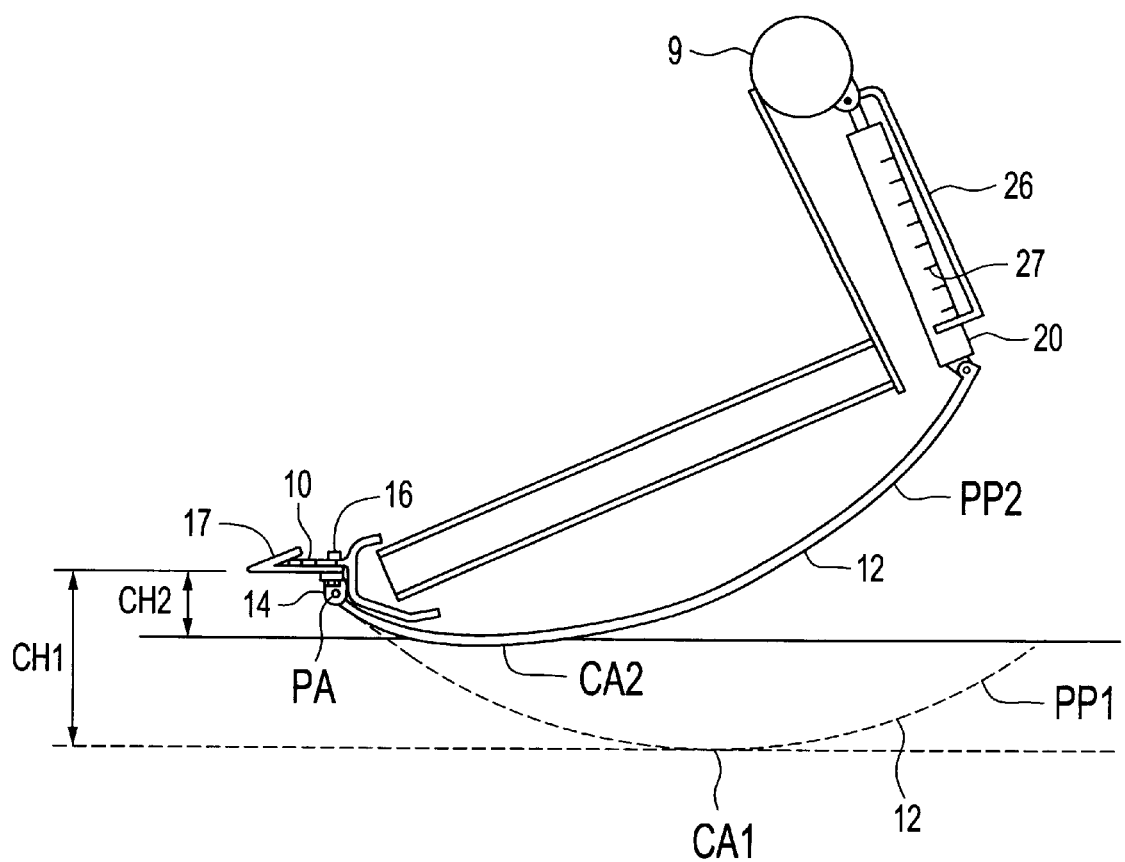
FIG. 4 is a schematic cross-sectional view of the header and float pans of the apparatus of FIG. 1.

Float pans 12 are pivotally attached at front ends thereof about a substantially horizontal pan axis PA to an underside of right and left portions of the header 9. As best seen in FIG. 4 the float pans 12 are attached to front attachment locations in proximity to the knife 10. These attachment locations are conveniently provided by pivot brackets 14 attached to guard bolts 16 that are used to attach the guards 17 to the header 9. Pan pins 18 extend through holes in the pivot brackets 14 and allow the pans 12 to move up and down. The float pans 12 extend rearward under the header 9. A pan actuator 20 on each side of the apparatus is attached at one end thereof by a pin through actuator brackets 19 on a rear portion of the float pan 12 and attached at an opposite end thereof to the header 9. The actuator 20 is operative to selectively move the rear end of the float pan 12 up and down, and also to maintain the rear end of the float pan 12 in a selected vertical position relative to the header 9 such that the header 9 slides along the ground on the float pans 12. The actuators 20 are illustrated as hydraulic cylinders controlled conventionally and operated remotely by an operator from an operating position on the combine 3.

Other conventional means are known that could also serve the purpose of moving the float pans 12 up and down relative to the header 9, and maintaining them in the proper position. Conceivably, a shaft could be rotatably mounted behind the knife and rotated to exert force on the pan through a cam or the like.

A float mechanism 30 is schematically illustrated in FIG. 1. Although available in various configurations, such float mechanisms comprise a right and left stop member 31 rigidly attached to the feeder house 5 and stops 32 fixed to the stop members 31 which bear against the bottom of the header 9 when the feeder house 5 moves up to lift the header 9 off the ground. When the feeder house 5 moves down, the header 9 also moves down until the float pans 12 contact the ground and the header 9 is lifted up off the stops 32. A bias element 33, typically a leaf or coil spring, exerts an upward force between the header 9 and the feeder house 5 so that only a portion of the header's weight is carried on the float pans 12. On some known headers, a bias force is also supplied by springs on gauge wheels which ride on the ground, as well as by springs exerting a force between the header and feeder house. A flexible connection 37 is provided between the header 9 and feeder house 5 to convey the crop.

Thus the float mechanism 30 supports the header 9 so that the header 9 can float up and down independently of the combine 3 and feeder house 5 in a float range between a lower limit defined by the stops 32 and an upper limit that is dictated by the configuration of the particular float mechanism 30 that is used. The force exerted by the bias element 33 can be adjusted so that the downward force on the float pans 12 is sufficient to keep the header down riding on the float pans 12 and is yet not so great as to retard the forward motion of the combine 3. In typical conditions it has been found that a weight of approximately 50 to 100 pounds on each float pan 12 is about right. If the feeder house 5 is moved down farther after the header 9 is resting on the float pans 12, the upward force exerted by the bias element 33 will be reduced and more weight will be put on the float pans 12. This weight can become excessive and cause the float pans 12 to push soil and retard the forward motion of the combine 3. As the combine 3 moves about the field the operator will raise and lower the feeder house 5 as required to maintain the header just into the full float position where the header 9 is off the stops 32 on both sides.

Figure 3:
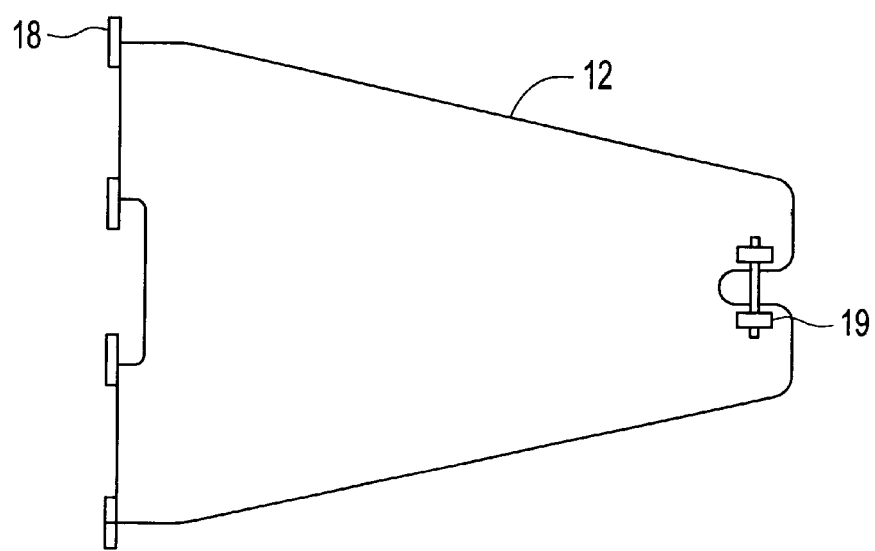
FIG. 3 is a top view of a typical float pan of the invention.

Right and left float pans 12 are illustrated in FIGS. 3 and 4. The front end of each float pan 12 is approximately twice as wide as the rear end thereof. The float pans 12 are wider at their front ends than at their rear ends since the float pans 12 will contact the ground first at their front ends and a large bearing area is desired. Also when cutting low, where precise control is more critical, the float pan 12 has a larger contact area than when cutting high. The tapering to a narrower width at the rear end is contemplated to reduce the amount of material that is thrown up onto the top surface of the float pans 12 during operation. During slight turns the pan will not dig in on the sides. The pan could also be curved up somewhat at the edges to reduce this digging in on turns.

As illustrated in FIG. 4, the float pans 12 curve down from the pivot brackets 14 and then curve upward towards the rear end of the header 9. The phantom lines in FIG. 4 indicate the position PP1 of the float pan 12 when the actuator 20 is extended and the cutting height CH1 of the knife 10 is fairly high. The contact area between the float pan 12 and the ground is indicated at CA1. When the actuator 20 is retracted and the rear end of the float pan 12 is raised to position PP2, the knife 10 moves lower to cutting height CH2 and the contact area between the float pan 12 and the ground moves forward toward the knife 10 to the position indicated at CA2.

The illustrated float pan 12 is shaped as the arc of a circle with a radius of 42 inches and this profile has provided satisfactory service in the field. The radius could change with changing conditions, depending for example on the maximum operating height of the header 9. The float pan 12 must be long enough to provide the required support at the maximum cutting height. Depending on the conditions it is contemplated that the radius should not likely be reduced to less than 30 inches.

Thus at the lower cutting height CH2, the contact area CA2 which dictates the up and down movement of the knife 10 is very close to the knife 10. This location close to the knife 10 is desirable because when cutting low, small variations in elevation between the terrain supporting the float pan 12 and the terrain under the knife 10 can cause the knife 10 to be either too high, missing crop, or too low, digging into the ground. The close proximity of the contact area CA2 and the knife 10 reduces the risk that there will be a large variation in elevation between the ground at the knife 10 and the ground at the contact area CA2. In contrast, conventional gauge wheels are located a considerable distance from the knife 10, and the possibility of large elevation differences is much greater. As the cutting height increases the contact area moves rearward away from the knife 10, but at higher cutting heights the risk of the knife 10 digging into the ground is much reduced in any event.

The right and left pan actuators 20R, 20L can be controlled so as to raise and lower the rear ends of the right and left float 12R, 12L pans independently of each other or in unison. When controlled independently, the header 9 can be operated with one side higher than the other which orientation can be desirable when following ditches or other slopes. Commonly the actuators will work in unison with the float pans 12R, 12L equal distances from the bottom of the header 9 and the header 9 level.

FIG. 4 shows a gauge 26 attached to the pan actuator 20 and operative to indicate the vertical position of the float pan 12. The gauge 26 slides up and down the barrel of the actuator 20 and gauge marks 27 on the barrel indicate the position of the float pan 12. The markings on the barrel can be calibrated to directly indicate the cutting height.

Depending on the terrain, the operator may be required to make frequent adjustments to maintain the feeder house 5 down just into the full float position where the header 9 is just above the stops 32 for optimum performance. To avoid this requirement, the apparatus 1 can further comprise a feeder house height control operative to activate the feeder house actuator 7 to move the feeder house 5 up and down as required to maintain a vertical position of the header 9 in the desired area of the float range as the combine 3 moves along the ground.

Figure 5:
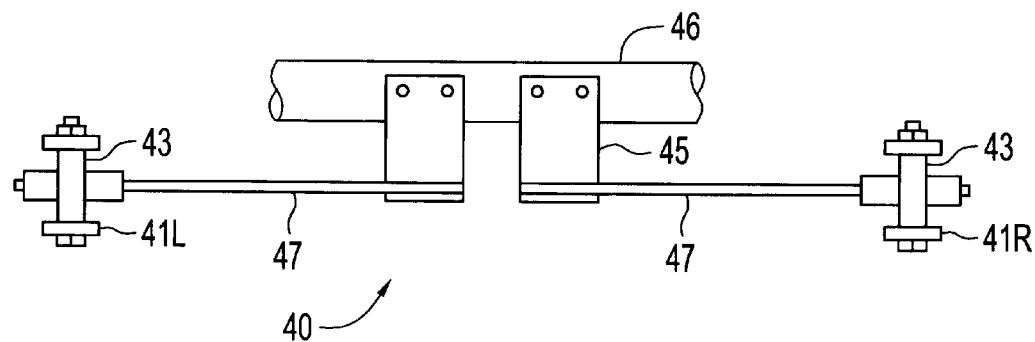
FIG. 5 is a schematic top view of a header position reader.
Figure 6:
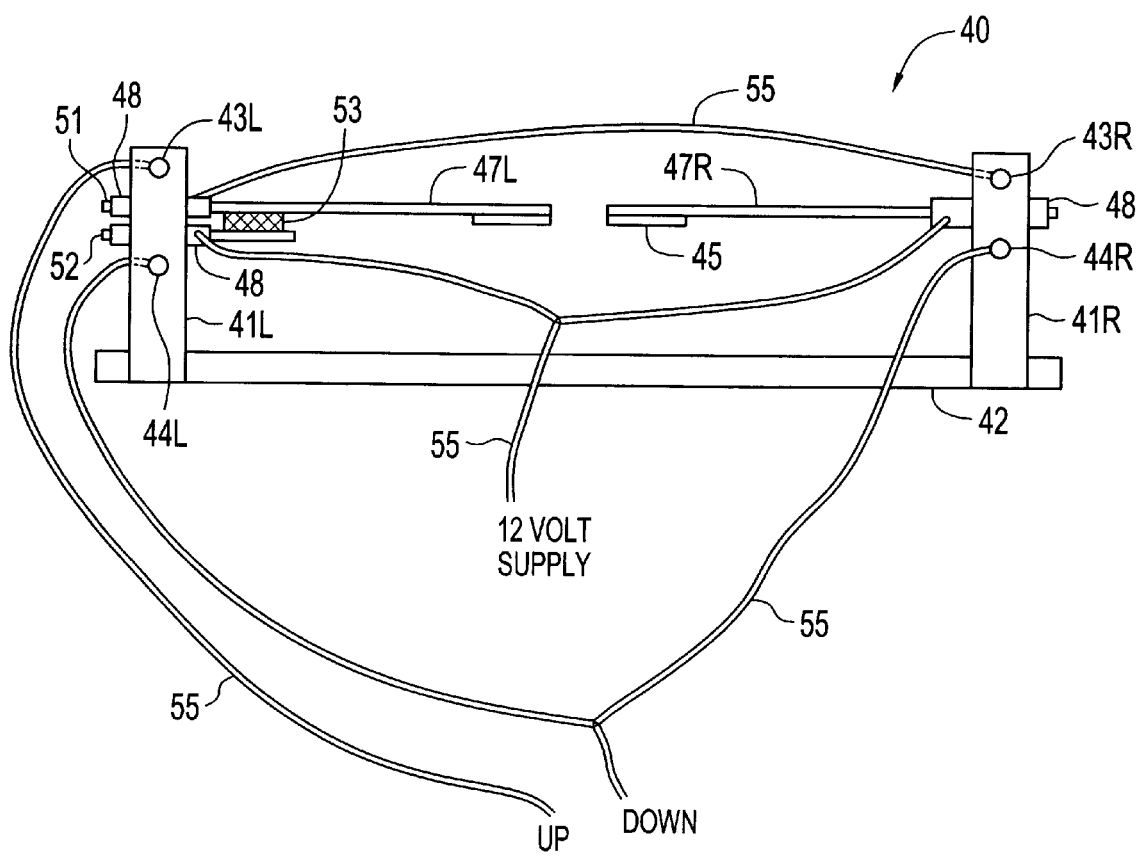
FIG. 6 is a schematic rear view of the header position reader of FIG. 5

As illustrated in FIG. 5, the feeder house height control comprises a header position reader, generally indicated at 40, mounted in fixed relation to the feeder house 5 and operative to send a down signal when the header 9 moves to a selected minimum vertical position and operative to send an up signal when the header 9 moves to a selected maximum vertical position. The minimum vertical limit is set so that the header is above and in proximity to the lower limit of the float range, and the upper limit is set so that the feeder house 5 will move up before excessive force is born by the float pans 12.

Thus the vertical limits are set so that the feeder house 5 is maintained in the required position to keep the header 9 in the desired position within the float range, just into the float position relative to the feeder house 5. It should be noted that the header 9 follows the ground and the feeder house 5 in turn follows the header 9 to maintain the proper relative position between the feeder house 5 and header 9. When the header 9 moves up relative to the feeder house 5, the feeder house 5 moves up as well, and vice versa. The minimum and maximum vertical limits then are the minimum and maximum heights of the header 9 relative to the feeder house 5.

A controller is operatively connected to the header position reader 40 and activates the feeder house actuator 7 to move the feeder house up and down in response to the signals. Such controllers are well known in the art and not further illustrated.

The header position reader 40 comprises contact brackets 41. The right and left contact brackets 41L, 41R are illustrated as fixed to a mounting member 42 for convenient fixed attachment to the feeder house 5 by clamps, bolts, or the like. A top contact member 43 and a bottom contact member 44 are fixed to the contact brackets 41 and extend forward therefrom. Rod brackets 45 are fixed to the top member 46 of the header 9 and extend rearward. A rod 47 is attached to the rear end of each rod bracket 45 and oriented to extend laterally between the top and bottom contact members 43, 44. The ends of the rods 47 are covered with a conductive sleeve 48 to facilitate electrical conductivity between the parts.

The left rod 47L is double ended such that the top rod end 51 contacts the top contact member 43 and the bottom rod end 52 contacts the bottom contact member 44. The rod ends 51, 52 are electrically insulated from each other by insulator 53, and are covered with a conductive sleeve 48.

Wires 55 are connected to the contact members 43, 44 and conductive sleeves 48 on the ends of the rods 47 as shown. A 12 volt supply is connected to the bottom rod end 52 on the left rod 47L and to the end of the right rod 47R. The right top contact member 43R is connected to the top rod end 51 on the left rod 47L. The left top contact member 43L is connected to the "UP" signal receptor on the controller, and the bottom contact members 44R, 44L are connected to the "DOWN" function indicator on the controller.

Thus when the left side of the header 9 moves down relative to the feeder house 5 the lower rod end 52 on the left rod 47L contacts the left bottom contact member 44L and current is conducted from the 12 volt supply to send a "DOWN" signal to the controller. If the right side moves down, the end of the right rod 47R contacts the right bottom contact member 44L and current is conducted from the 12 volt supply to send a "DOWN" signal to the controller. When contact is broken, the downward movement stops. Thus if either side of the header 9 moves to the lower limit defined by the bottom contact members 44, the feeder house 5 will be moved lower to prevent the header 9 from contacting the stops 32 and being raised out of the float position. This operation where either side reaching the lower limit moves the feeder house 5 down ensures that at all times both sides of the header 9 are above the stops in the float position.

In contrast the "UP" function is activated only when both the right and left sides of the header 9 are signaling for an upward movement. The 12 volt supply is connected to the rod end on the right rod 47R. The right top contact member 43R is connected by a wire 55 to the upper rod end 51 on the left rod 47L, and the left top contact member 43L is connected to the "UP" function indicator on the controller. Thus when only the right rod 47R contacts the right top contact member 43R, a signal, in the form of a closed contact, is sent down the wire to the top rod end 51 but goes no further. Only when the top rod end 51 contacts the left top contact member 43L will the "UP" signal be sent to the controller. Similarly when only the top rod end 51 on the left rod 47L is at the upper limit a closed contact signal is sent, but there is no voltage coming from the right side to activate the "UP" function. Only when the right rod 47R contacts the right top contact member 43R is voltage received which can then pass current through to the "UP" on the controller.

This operation where both sides must reach the upper limit in order to move the feeder house 5 up again ensures that at all times both sides of the header 9 are above the stops in the float position. If the header 9 was tilted, one side of the header 9 could be at the upper limit and the other down such that an upward movement of the feeder house 5 would cause the lower side to hit the stop 32 and move out of float position. As well this mode of operation ensures that the "UP" and "DOWN" functions are not both activated at the same time. If the header 9 was tilted far enough, one side could be at the upper limit and the other at the lower limit, with one side calling for the "UP" function and the other side for the "DOWN" function. In the illustrated system, the header 9 would move down rather than up, ensuring that the float position was maintained. In order to prevent damage in such situations the rods 47 are made of fiberglass, plastic or some such resilient material so they will bend and not break.

The header position reader 40 described above is but one illustration of a mechanism to detect the relative positions of the header 9 and feeder house 5.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A floating harvesting header apparatus including a crop intake attached along a front end thereof and adapted at a rear end thereof for attachment to a harvesting vehicle for movement along the ground in an operating travel direction, the apparatus comprising:

at least one float pan pivotally attached at a front end thereof about a substantially horizontal axis to an underside of the header at a front attachment location in proximity to the crop intake, the float pan extending rearward under the header;

a pan actuator attached to the float pan and to the header, the pan actuator operative to selectively move a rear end of the float pan up and down, and operative to maintain the rear end of the float pan in a selected vertical position relative to the header such that the header slides along the ground on the float pan;

a float mechanism supporting the header such that the header can float up and down independently of the harvesting vehicle in a float range wherein only a portion of the header's weight is carried on the float pan;

wherein the float pan curves down from the front attachment location and then curves upward towards the rear end of the header such that when the rear end of the float pan is raised the crop intake moves lower and a contact area between the float pan and the ground moves forward toward the crop intake.

2. The apparatus of claim 1 wherein the float pan has a profile in the shape of the arc of a circle.

3. The apparatus of claim 2 wherein the circle has a radius of greater than 30 inches.

4. The apparatus of claim 3 wherein the circle has a radius between 40 and 45 inches.

5. The apparatus of claim 1 further comprising a right float pan pivotally attached under a right side of the header and a left float pan pivotally attached under a left side of the header, and further comprising corresponding right and left pan actuators operable to raise and lower the rear ends of the right and left float pans.

6. The apparatus of claim 5 wherein the right and left pan actuators are operable to raise and lower the rear ends of the right and left float pans independently of each other or in unison.

7. The apparatus of claim 5 wherein the right and left pan actuators are operated remotely by an operator from an operating position.

8. The apparatus of claim 1 wherein at least one float pan is wider at the front end thereof than at the rear end thereof.

9. The apparatus of claim 8 wherein the front end of the at least one float pan is substantially twice as wide as the rear end thereof.

10. The apparatus of claim 1 further comprising a gauge operative to indicate the vertical position of at least one float pan.

11. The apparatus of claim 10 wherein the gauge is attached to the pan actuator operating the at least one float pan.

12. The apparatus of claim 1 where the crop intake comprises a knife.

13. A combine and floating header apparatus comprising:

a feeder house pivotally attached at a rear end thereof to a front end of the combine about a substantially horizontal feeder axis;

a feeder house actuator operative to selectively pivot the feeder house up and down about the feeder axis;

a header flexibly attached at a rear end thereof to a front end of the feeder house for cutting crop and feeding the cut crop into the feeder house;

a crop intake attached along a front end of the header;

a right float pan pivotally attached at a front end thereof about a substantially horizontal axis to an underside of a right portion of the header at a right front attachment location in proximity to the crop intake, the right float pan extending rearward under the header;

a right pan actuator attached to the right float pan and to the header, the right pan actuator operative to selectively move a rear end of the right float pan up and down, and operative to maintain the rear end of the right float pan in a selected vertical position relative to the header such that the right portion of the header slides along the ground on the right float pan;

a left float pan pivotally attached at a front end thereof about a substantially horizontal axis to an underside of a left portion of the header at a left front attachment location in proximity to the crop intake, the left float pan extending rearward under the header;

a left pan actuator attached to the left float pan and to the header, the left pan actuator operative to selectively move a rear end of the left float pan up and down, and operative to maintain the rear end of the left float pan in a selected vertical position relative to the header such that the left portion of the header slides along the ground on the left float pan;

a float mechanism supporting the header such that the header can float up and down independently of the combine in a float range wherein only a portion of the header's weight is carried on the float pans;

wherein the float pans curve down from the front attachment locations and then curve upward towards the rear end of the header such that when the rear end of the float pans are raised the crop intake moves lower and a contact area between the float pans and the ground moves forward toward the crop intake.

14. The apparatus of claim 13 wherein the float pan has a profile in the shape of the arc of a circle.

15. The apparatus of claim 13 wherein the right and left pan actuators are operable to raise and lower the rear ends of the right and left float pans independently of each other or in unison.

16. The apparatus of claim 13 wherein the right and left pan actuators are operated remotely by an operator from an operating position on the combine.

17. The apparatus of claim 13 wherein each float pan is wider at the front end thereof than at the rear end thereof.

18. The apparatus of claim 17 wherein the front end of each float pan is substantially twice as wide as the rear end thereof.

19. The apparatus of claim 13 further comprising a gauge operative to indicate the vertical position of at least one float pan.

20. The apparatus of claim 19 wherein the gauge is attached to the pan actuator operating the at least one float pan.

21. The apparatus of claim 13 further comprising a feeder house height control operative to activate the feeder house actuator to move the feeder house up and down as required to maintain the feeder house in a vertical position of relative to the header such that the header remains in the float range as the combine moves along the ground.

22. The apparatus of claim 21 wherein the feeder house height control comprises:
   a header position reader mounted in fixed relation to the feeder house and operative to send a down signal when the header moves to a selected minimum vertical position and operative to send an up signal when the header moves to a selected maximum vertical position;
   a controller operatively connected to the header position reader and operative to activate the feeder house actuator to move the feeder house up and down in response to the signals.

23. The apparatus of claim 22 wherein the selected minimum vertical position is above and in proximity to the lower limit of the float range.

24. The apparatus of claim 22 wherein the header position reader comprises a top contact member fixed to the feeder house and a bottom contact member fixed to the feeder house and wherein a rod fixed to the header extends between the top and bottom contact members, and wherein an up signal is sent when the rod contacts the top contact member, and wherein a down signal is sent when the rod contacts the bottom contact member.

25. The apparatus of claim 21 wherein the feeder house height control comprises:
   a right header position reader mounted in fixed relation to the feeder house and operative to send a down signal when the right portion of the header moves to a selected minimum vertical position and operative to send an up signal when the right portion of the header moves to a selected maximum vertical position;
   a left header position reader mounted in fixed relation to the feeder house and operative to send a down signal when the left portion of the header moves to a selected minimum vertical position and operative to send an up signal when the left portion of the header moves to a selected maximum vertical position;
   wherein the controller is operatively connected to the right and left header position readers, and the controller operative to activate the feeder house actuator to move the feeder house up and down in response to the signals from the right and left header position readers.

26. The apparatus of claim 25 wherein the controller is operative to activate the feeder house actuator to move the feeder house up when an up signal is sent by both the right header position reader and the left header position reader, and to move the feeder house down when a down signal is sent by either the right header position reader or the left header position reader.

27. The apparatus of claim 13 where the crop intake comprises a knife.

* * * * *